United States Patent
Gaughan et al.

(10) Patent No.: US 10,029,666 B2
(45) Date of Patent: *Jul. 24, 2018

(54) HOT WHEEL PROTECTION VALVE

(71) Applicant: Westinghouse Air Brake Technologies Corporation, Wilmerding, PA (US)

(72) Inventors: Edward W. Gaughan, Greensburg, PA (US); William John Potter, Trafford, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/662,438

(22) Filed: Mar. 19, 2015

(65) Prior Publication Data
US 2016/0272185 A1 Sep. 22, 2016

(51) Int. Cl.
*B60T 15/02* (2006.01)
*B60T 15/54* (2006.01)
*B61H 13/00* (2006.01)
*B60T 13/66* (2006.01)
*B60T 17/22* (2006.01)

(52) U.S. Cl.
CPC ............ *B60T 15/54* (2013.01); *B60T 13/665* (2013.01); *B60T 17/228* (2013.01); *B61H 13/00* (2013.01)

(58) Field of Classification Search
CPC ........ B60T 13/147; B60T 15/18; B60T 15/54; B60T 8/3665; B60T 8/367; B60T 8/4283
USPC .......................................................... 303/68
See application file for complete search history.

(56) References Cited

U.S. PATENT DOCUMENTS

| | | | | |
|---|---|---|---|---|
| 2,500,555 | A | * | 3/1950 | Majneri ................ B60T 13/147 137/102 |
| 3,001,832 | A | * | 9/1961 | McClure ................. B60T 15/54 137/625.27 |
| 3,228,729 | A | | 1/1966 | Schubert |
| 3,443,839 | A | | 5/1969 | Hinrichs et al. |
| 3,526,248 | A | * | 9/1970 | Billeter ................... B60T 15/02 137/599.05 |
| 3,716,276 | A | * | 2/1973 | Wilson .................. B60T 15/302 303/36 |
| 3,941,432 | A | * | 3/1976 | Blanz ..................... B60T 15/22 303/52 |
| 4,003,605 | A | * | 1/1977 | Fannin ................... B60T 13/261 303/13 |

(Continued)

FOREIGN PATENT DOCUMENTS

EP 2952405 A1 9/2015

*Primary Examiner* — Anna M Momper
*Assistant Examiner* — Mahbubur Rashid
(74) *Attorney, Agent, or Firm* — The Webb Law Firm

(57) ABSTRACT

A hot wheel protection valve includes a body defining a piston passageway and at least one piston positioned within the piston passageway, a first biasing member positioned on a first end of the at least one piston and biased towards a second end of the at least one piston, a brake pipe in fluid communication with the second end of the at least one piston, a brake cylinder in fluid communication with the second end of the at least one piston, and an exhaust port defined in the body and positioned between first and second ends of the valve. Pressurized fluid may be vented from the brake cylinder via the exhaust port upon a combination of brake cylinder pressure and brake pipe pressure exceeding a force exerted by the first biasing member.

17 Claims, 7 Drawing Sheets

(56) References Cited

U.S. PATENT DOCUMENTS

| | | |
|---|---|---|
| 4,105,257 A | 8/1978 | Engle et al. |
| RE31,386 E | 9/1983 | McEathron |
| 4,407,548 A | 10/1983 | Graham |
| 4,474,412 A | 10/1984 | Schmitt |
| 4,558,907 A | 12/1985 | Reiss et al. |
| 4,585,279 A * | 4/1986 | Doto ................. B60T 8/303 188/195 |
| 4,775,194 A | 10/1988 | Vaughn et al. |
| RE32,885 E | 3/1989 | Graham |
| 4,875,739 A | 10/1989 | Hart et al. |
| 5,083,843 A | 1/1992 | Engle |
| 5,106,168 A * | 4/1992 | McKay ................. B60T 8/1893 188/195 |
| 5,269,595 A * | 12/1993 | McKay ................. B60T 8/1893 188/195 |
| 5,332,297 A | 7/1994 | Cunkelman et al. |
| 5,378,055 A * | 1/1995 | Maas ................. B60T 8/4291 303/113.1 |
| 5,429,427 A | 7/1995 | Gayfer |
| 5,564,794 A * | 10/1996 | Hart ................. B60T 13/665 303/15 |
| 5,628,550 A * | 5/1997 | Zaviska ................. B60T 8/341 137/522 |
| 5,722,736 A | 3/1998 | Cook |
| 5,785,392 A | 7/1998 | Hart |
| 5,788,338 A * | 8/1998 | Hart ................. B60T 13/665 303/15 |
| 6,116,280 A | 9/2000 | Goodell |
| 6,609,767 B2 | 8/2003 | Mortenson et al. |
| 6,609,769 B2 | 8/2003 | Hart et al. |
| 6,971,723 B2 | 12/2005 | Engle et al. |
| 7,306,294 B2 | 12/2007 | Hart et al. |
| 7,556,322 B2 | 7/2009 | Veltri et al. |
| 8,262,172 B2 * | 9/2012 | Jimenez ................. B60T 17/228 246/170 |
| 2003/0193237 A1 | 10/2003 | Hart et al. |
| 2004/0130205 A1 | 7/2004 | Wood et al. |
| 2004/0130207 A1 | 7/2004 | Corley, Jr. |
| 2009/0229932 A1 | 9/2009 | Reynolds et al. |
| 2011/0108374 A1 * | 5/2011 | Call ................. B60T 15/041 188/33 |
| 2014/0102558 A1 | 4/2014 | Call et al. |
| 2014/0125115 A1 | 5/2014 | Gaughan et al. |
| 2016/0046273 A1 | 2/2016 | Wright et al. |

* cited by examiner

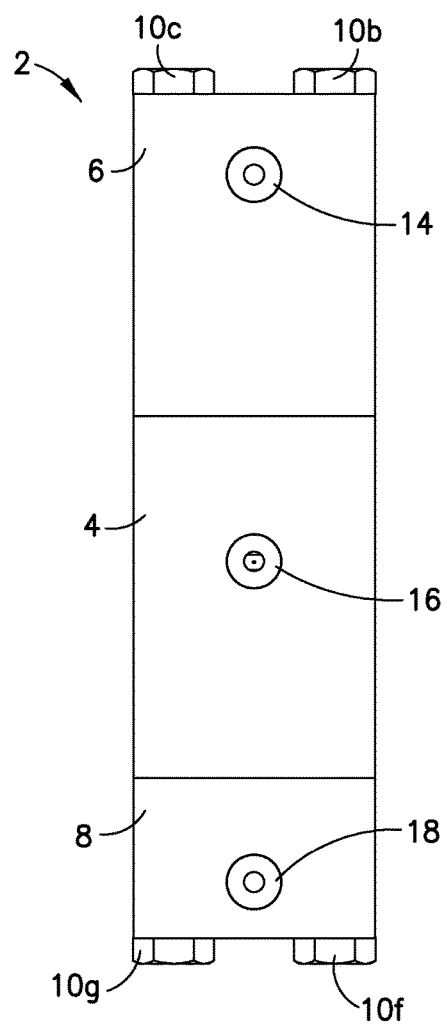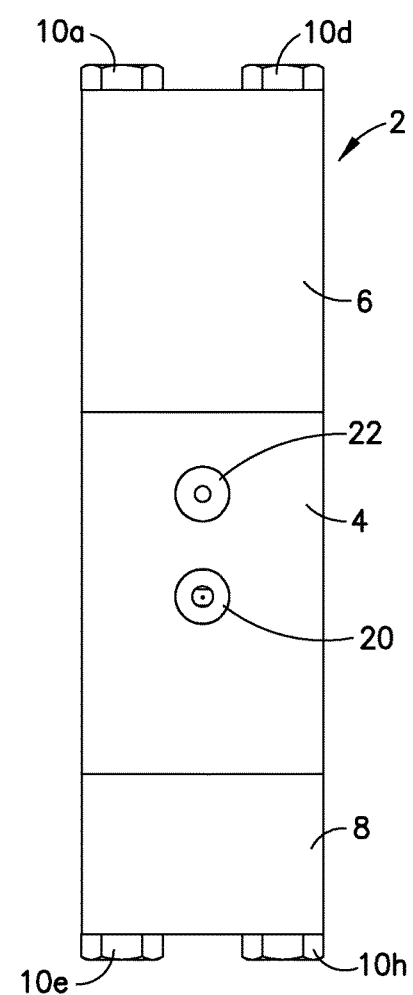

HOT WHEEL PROTECTION VALVE

BACKGROUND OF THE INVENTION

Field of the Invention

The present disclosure is directed to valves for railway cars and, more particularly, to a hot wheel protection valve for a railway car.

Description of Related Art

Current brake systems for railway vehicles experience leakage of pressurized fluid into the brake cylinder of the brake system. The Association of American Railroads' specification for a single railway car specifies allowable leakage into/out-of the brake cylinder at the rate of +/−1-psi/min. At this rate, acceptable loss of brake cylinder pressure is permitted while still safely maintaining brake cylinder pressure levels for the operation of the railway vehicle's brake system. When operating a railway vehicle on a grade for an extended period of time, however, a minimal level of leakage into the brake cylinder in one minute can increase to a high enough pressure to cause excessive heat to be generated by the excessive pressure. This excessive pressure results in higher than desired shoe force creating a "hot wheel" condition in which forces within the brake cylinder that cause the brake cylinder and the wheels of the railway vehicle to experience excessive heat. By venting pressure from the brake cylinder, this "hot wheel" condition is avoided.

An example of a preexisting brake cylinder pressure reducing valve is disclosed in U.S. Pat. No. 5,083,843. The brake cylinder pressure reducing valve is used to control the release of brake cylinder pressure. Upon the graduated release of brake cylinder pressure, brake pipe pressure is restored by a locomotive brake valve. The control valve of the release valve is moved to its full release position and brake cylinder pressure is rapidly reduced. The reduction in brake cylinder pressure reduces a downward force exerted on a diaphragm by the brake cylinder pressure in a first chamber, allowing the graduating volume air pressure to move a stem upward. Thus, the first chamber is sealed and air is retained in the brake cylinder at a value equal to the remaining reduction in brake pipe pressure. Therefore, with the graduating check valve seated, further exhaust of brake cylinder pressure is prevented and the valve remains at a stable position. Brake cylinder pressure can be reduced in a predetermined proportion to a brake pipe pressure increase. Therefore, this release valve is not configured to release brake cylinder pressure upon the brake cylinder exceeding a predetermined amount. The brake cylinder is released as a function of an increase in brake pipe pressure, not through an increase in the brake cylinder pressure.

Another example of a preexisting brake cylinder pressure reducing valve is disclosed in U.S. Pat. No. 6,609,769. A pneumatically graduated brake pressure release valve for a freight train brake system is used to release pressure from a brake cylinder. The graduated release valve controls the exhaust of the brake cylinder pressure. A metering valve portion of the graduated release valve exhausts brake cylinder pressure generally proportional to an increase in brake pipe pressure. On one side, a graduating piston is held in position by pressure from an emergency reservoir. On an opposite side, pressure from the brake pipe and a brake cylinder exhaust urge against the piston. Once the brakes have been applied, if a reduction in brake cylinder pressure is desired, the brake pipe pressure must be increased. This increase in brake pipe pressure unbalances the pressures acting on the piston and causes the brake cylinder to be exhausted to atmosphere. The brake cylinder will only exhaust, however, until the brake cylinder pressure decreases proportionally to the brake pipe pressure increase. The pressure exhausted from the brake cylinder is generally a function of the increase in brake pipe pressure. This graduated release valve is not configured to reduce brake cylinder pressure upon an increase in brake cylinder pressure due to leakage of pressurized fluid into the brake cylinder. Further, this type of graduated release valve does not contemplate the use of a biasing member to counteract the pressures of the brake pipe and the brake cylinder.

SUMMARY OF THE INVENTION

Preexisting graduated brake cylinder release valves, some of which have been discussed hereinabove, are not configured to exhaust brake cylinder pressure upon leakage of pressurized fluid into the brake cylinder. Many of the preexisting graduated brake cylinder release valves release brake cylinder pressure in proportion to an increase in brake pipe pressure. Further, none of the preexisting brake cylinder release valves use a biasing member to provide a force biased against the pressures of the brake pipe and the brake cylinder. This type of biasing member may be used to provide a predetermined amount of pressure corresponding to an amount of pressurized fluid that may leak into the brake cylinder before the brake cylinder is exhausted.

In one embodiment, a hot wheel protection valve includes a body defining a piston passageway and at least one piston positioned within the piston passageway, a first biasing member positioned on a first end of the at least one piston and biased towards a second end of the at least one piston, a brake pipe in fluid communication with the second end of the at least one piston, a brake cylinder in fluid communication with the second end of the at least one piston, and an exhaust port defined in the body and positioned between first and second ends of the valve. Pressurized fluid may be vented from the brake cylinder via the exhaust port upon a combination of brake cylinder pressure and brake pipe pressure exceeding a force exerted by the first biasing member.

The first biasing member may be a spring. The brake cylinder pressure may push the at least one piston towards the first end of the valve until the combination of the brake cylinder pressure and the brake pipe pressure equalizes with the force exerted by the first biasing member. An emergency reservoir may be in fluid communication with the first end of the valve. Pressurized air may be vented from the brake cylinder via the exhaust port upon the combination of the brake pipe pressure and the brake cylinder pressure exceeding a combination of emergency reservoir pressure and the force exerted by the first biasing member. A second biasing member may be positioned in the second end of the valve. The second biasing member may be biased towards the first end of the valve. Pressurized fluid may be vented from the brake cylinder via the exhaust port upon a combination of the brake pipe pressure, the brake cylinder pressure, and a force exerted by the second biasing member exceeding the force exerted by the first biasing member. The second biasing member may be a spring. A retainer pressure pipe may be in fluid communication with the first end of the at least one piston and a retainer cavity. Use of the valve may be nullified by supplying pressurized fluid from the retainer pressure pipe to the first end of the at least one piston. At least one bushing may be positioned in the piston passageway. The at least one bushing may include at least one bushing passageway in fluid communication with the exhaust port and the piston passageway. Pressurized fluid may be vented from the brake cylinder through the at least one bushing passageway of the at least one bushing and the exhaust port.

In another embodiment, a railway vehicle with a hot wheel protection valve includes a body defining a piston passageway and at least one piston positioned within the piston passageway, a first biasing member positioned against a first end of the at least one piston and biased towards a second end of the at least one piston, a brake pipe in fluid communication with a railway vehicle and the second end of the at least one piston, a brake cylinder in fluid communication with the second end of the at least one piston, and an exhaust port defined in the body and positioned between first and second ends of the valve. Pressurized fluid may be vented from the brake cylinder via the exhaust port upon a combination of brake cylinder pressure and brake pipe pressure exceeding a force exerted by the first biasing member. The brake cylinder pressure may push the at least one piston towards the first end of the valve until the combination of the brake cylinder pressure and the brake pipe pressure equalizes with the force exerted by the first biasing member.

In yet another embodiment, a method of venting excess pressurized air from a brake cylinder of a railway vehicle includes the steps of providing a hot wheel protection valve and venting pressurized fluid from the brake cylinder via the exhaust port upon a brake cylinder pressure exceeding a force exerted by the first biasing member. The hot wheel protection valve may include at least one piston positioned in between a first end and a second end of the valve, first biasing member biased against a first end of the at least one piston, a brake cylinder in fluid communication with a second end of the at least one piston, and an exhaust port positioned in between the first and second ends of the valve.

A further step of the method may include providing a second biasing member biased against a second end of the at least one piston, and venting pressurized fluid from the brake cylinder via the exhaust port upon a combination of the brake cylinder pressure and a force exerted by the second biasing member exceeding the force exerted by the first biasing member. A further step of the method may include providing a second biasing member biased against a second end of the at least one piston and an emergency reservoir in fluid communication with the first end of the at least one piston. A further step of the method may include venting pressurized fluid from the brake cylinder via the exhaust port upon a combination of the brake cylinder pressure and a force exerted by the second biasing member exceeding a combination of the force exerted by the first biasing member and emergency reservoir pressure. Yet a further step of the method may include providing pressurized fluid from a retainer pressure pipe to the first end of the at least one piston. Use of the valve may be nullified due to the combination of the force exerted by the first biasing member and the retainer pressure far exceeding the brake cylinder pressure.

These and other features and characteristics of the hot wheel protection valve, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the disclosure. As used in the specification and claims, the singular form of "a", "an", and "the" include plural referents unless the context clearly dictates otherwise.

BRIEF DESCRIPTION OF THE DRAWINGS

FIG. 3 is a side view of the hot wheel protection valve of FIG. 1.

FIG. 4 is another side view of the hot wheel protection valve of FIG. 1.

DESCRIPTION OF THE PREFERRED EMBODIMENTS

Figure 1:
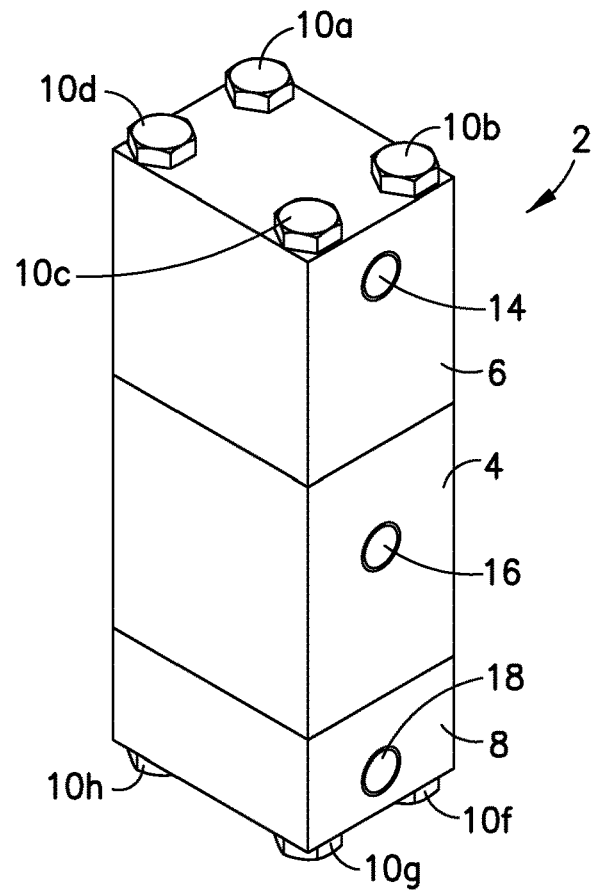
FIG. 1 is a front perspective view of a hot wheel protection valve in accordance with one embodiment.
Figure 2:
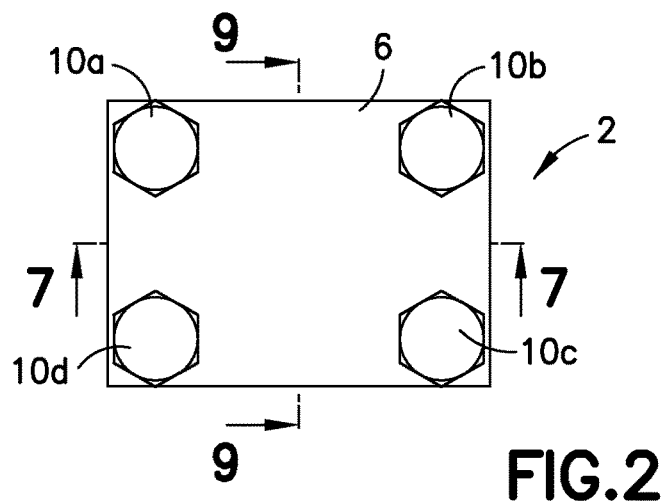
FIG. 2 is a top view of the hot wheel protection valve of FIG. 1.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to the drawings in which like reference characters refer to like parts throughout the several views thereof, the present disclosure is generally directed to a hot wheel protection valve for use with a railway vehicle to vent excess pressurized fluid that may leak into the brake cylinder of the railway vehicle.

Figure 7:
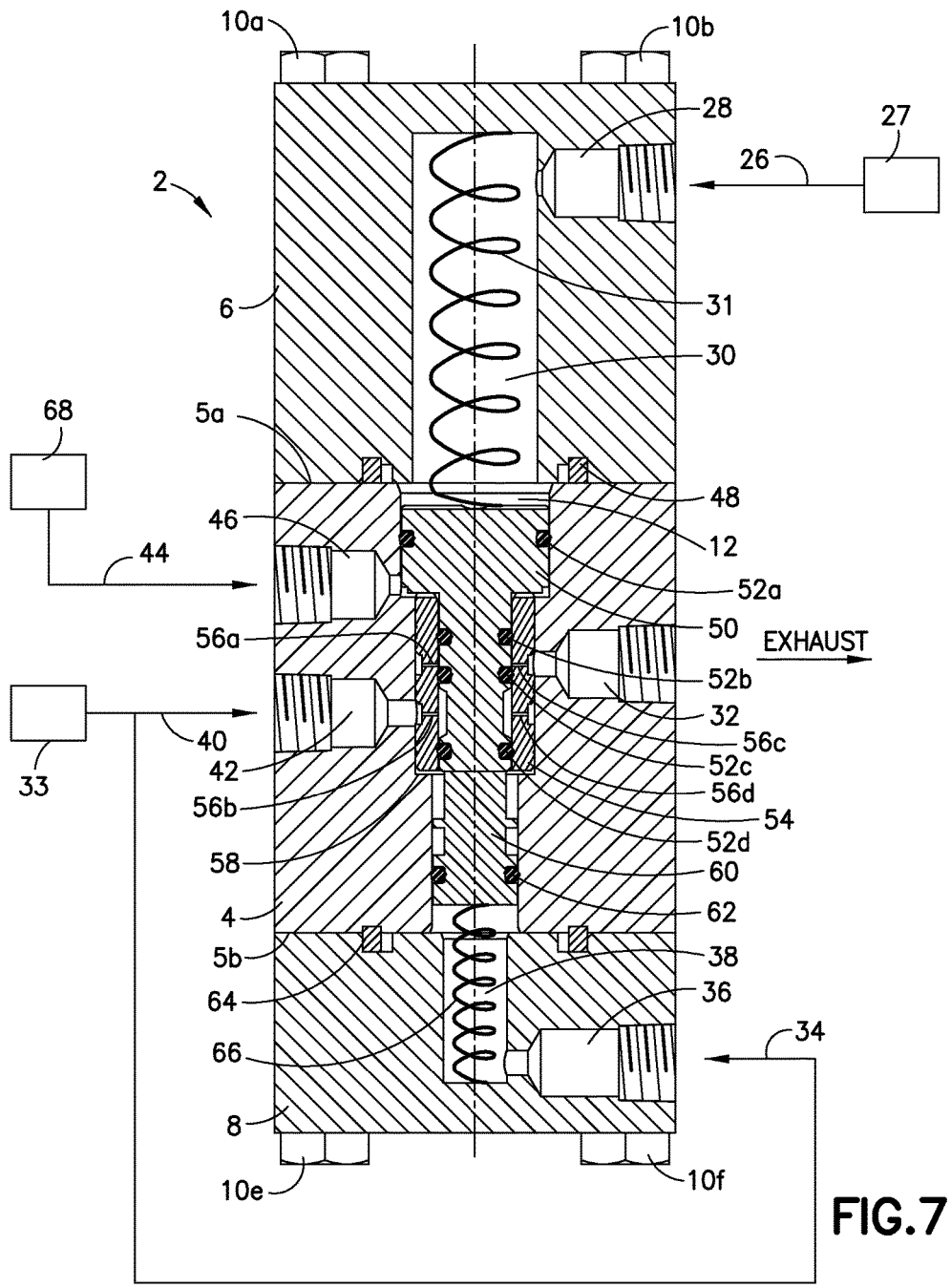
FIG. 7 is a cross-sectional view of the hot wheel protection valve of FIG. 1 along line 7-7 in FIG. 2.
Figure 8:
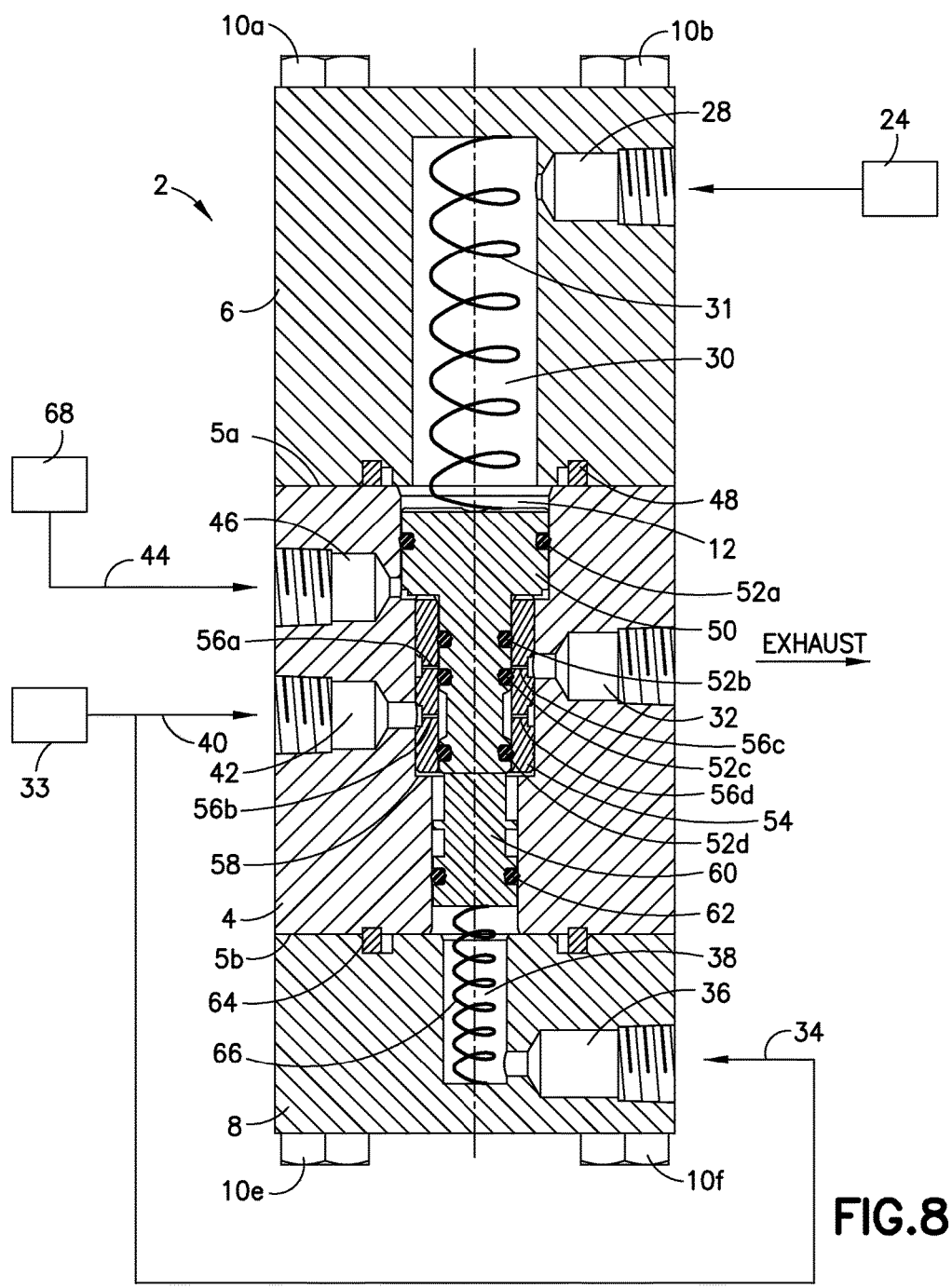
FIG. 8 is cross-sectional view of the hot wheel protection valve of FIG. 1 according to another embodiment.
Figure 9:
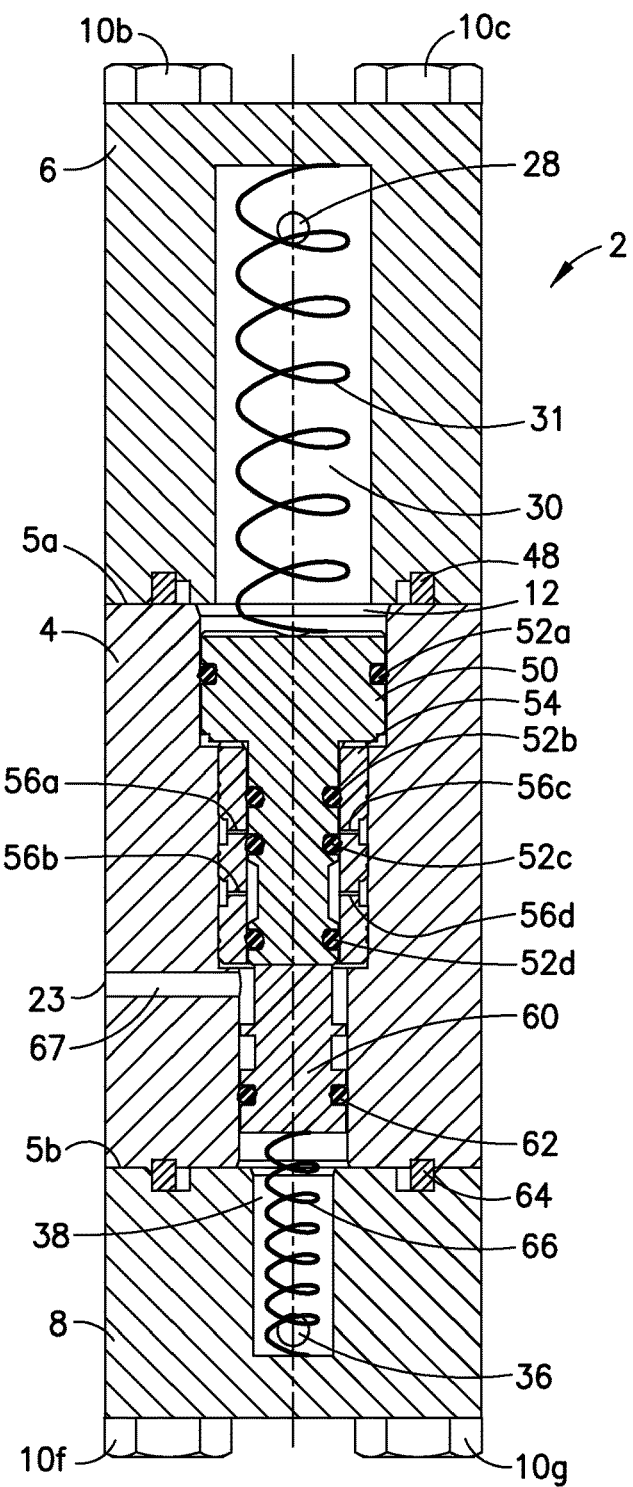
FIG. 9 is a cross-sectional view of the hot wheel protection valve of FIG. 1 along line 9-9 in FIG. 2.

Referring initially to FIGS. 1-5, an embodiment of the hot wheel protection valve 2 is shown. Hot wheel protection valve 2, as described herein, is intended for use in a brake system of a railway car, as will be readily apparent to those skilled in the rail vehicle art. Hot wheel protection valve 2 is adapted for use in railway vehicles used for passenger and/or cargo transit. However, this use is intended to be non-limiting and hot wheel protection valve 2 has applications in railway cars generally. Hot wheel protection valve 2 in the depicted embodiment generally includes a main body 4, a top cover 6, and a bottom cover 8. In this depicted embodiment, hot wheel protection valve 2 is substantially rectangular. A plurality of fasteners 10a-10h may be used to couple main body 4 to top cover 6 and bottom cover 8. It is also contemplated that main body 4, top cover 6, and bottom cover 8 may be formed as one monolithic structure. As shown in FIGS. 7-9, a piston passageway 12 may be defined in main body 4 and may extend longitudinally from a top surface 5a of main body 4 to a bottom surface 5b of main body 4. In one embodiment, piston passageway 12 may be substantially cylindrical.

Figure 5:
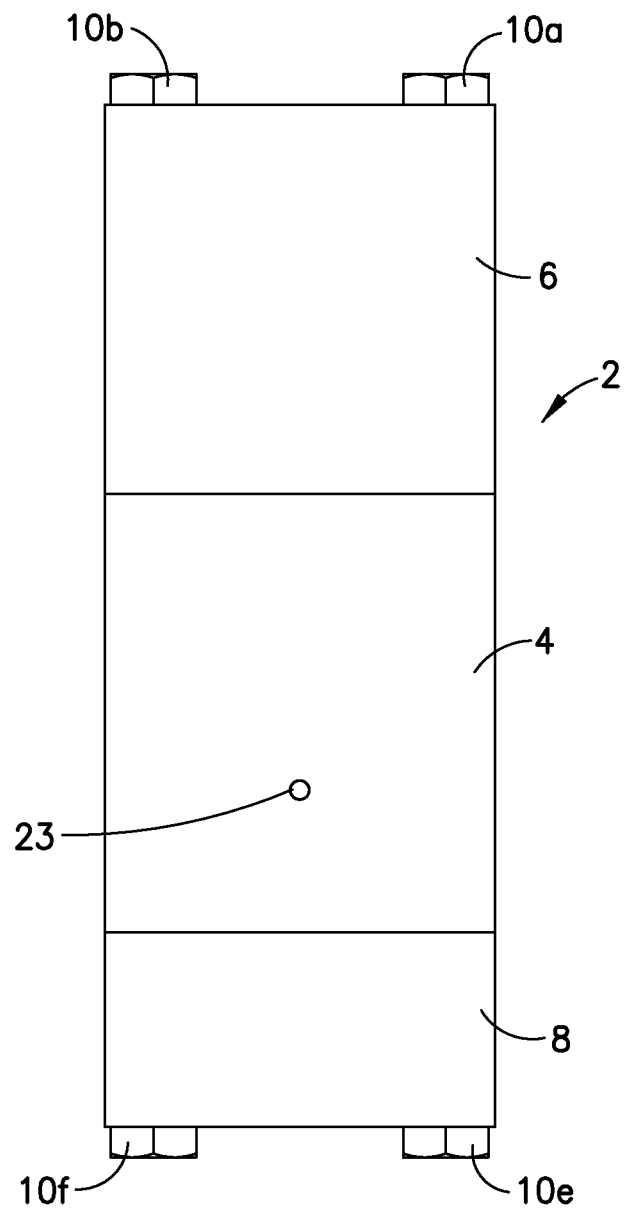
FIG. 5 is a back view of the hot wheel protection valve of FIG. 1.
Figure 6:
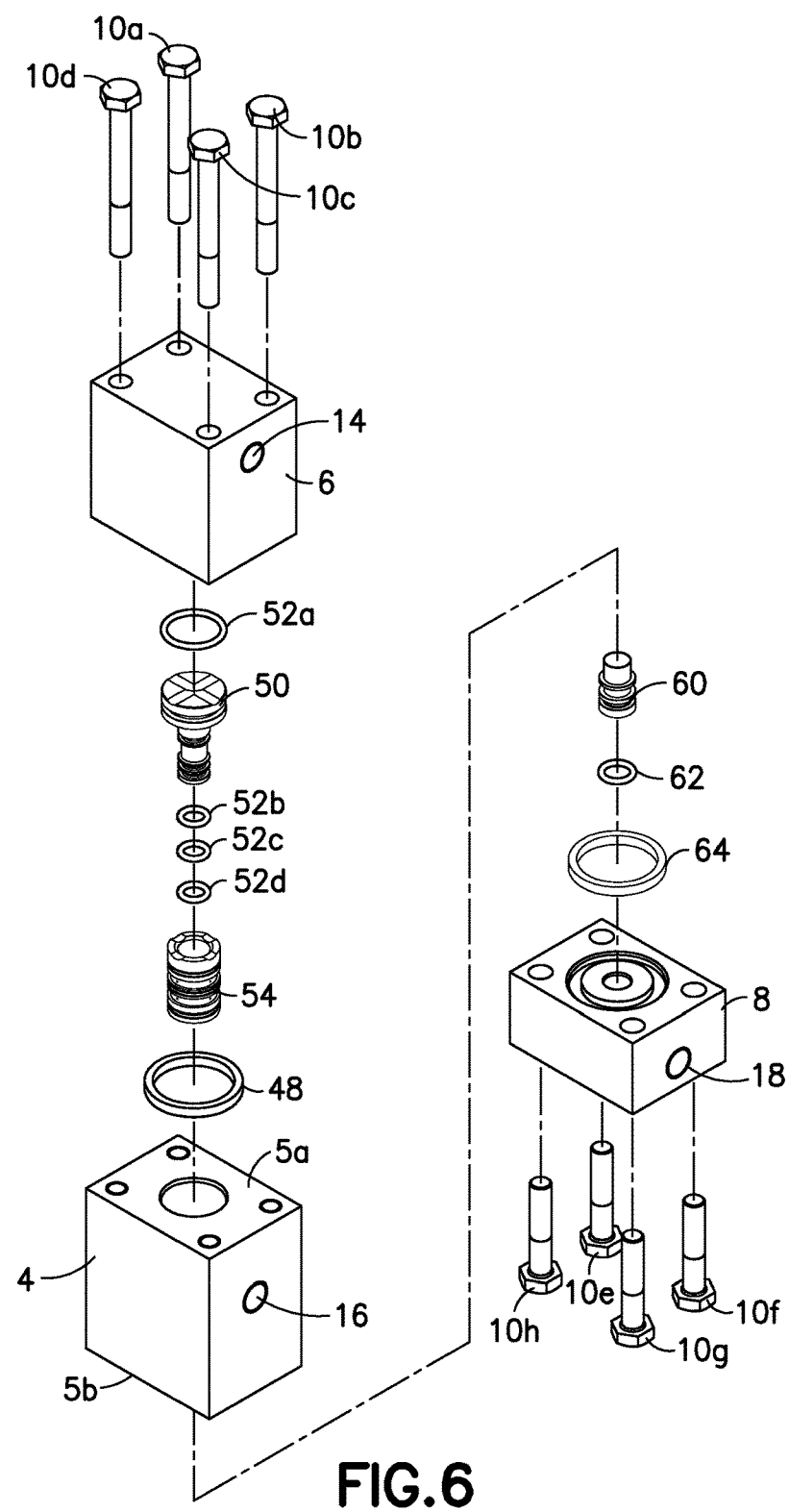
FIG. 6 is an exploded view showing several components of the hot wheel protection valve of FIG. 1.

A retainer/emergency reservoir opening 14 may be defined in a side of top cover 6. An exhaust opening 16 may be defined in one side of main body 4. A first brake cylinder opening 18 may be defined in one side of bottom cover 8. In one embodiment, retainer/emergency reservoir opening 14, exhaust opening 16, and first brake cylinder opening 18 are defined in the same said of hot wheel protection valve 2. A second brake cylinder opening 20 may be defined in an opposing side of main body 4 from exhaust opening 16. A brake pipe opening 22 may be defined in the same side of main body 4 as second brake cylinder opening 20. In one embodiment, second brake cylinder opening 20 and brake pipe opening 22 are defined in the same side of hot wheel protection valve 2. In another embodiment, retainer/emergency reservoir opening 14, exhaust opening 16, and first brake cylinder opening 18 are defined in an opposing side of hot wheel protection valve 2 from second brake cylinder opening 20 and brake pipe opening 22. As shown in FIG. 5, an opening 23 may be defined in a back side surface of main body 4.

In one embodiment, shown in FIG. 8, an emergency reservoir 24 may be in fluid communication with hot wheel protection valve 2 via retainer/emergency reservoir opening 14. In another embodiment, a retainer pressure pipe 26 is in fluid communication with a retainer cavity 27 and hot wheel protection valve 2 via retainer/emergency reservoir opening 14. Due to leakage that may occur in the emergency reservoir 24, the emergency reservoir 24 may lose pressurized fluid, thereby fluctuating the amount of pressurized fluid that is provided to the hot wheel protection valve 2. Therefore, it is preferable to establish fluid communication between hot wheel protection valve 2 and retainer cavity 27. Pressurized fluid is supplied through a retainer pressure passageway 28 to an inner cavity 30 defined in top cover 6. Inner cavity 30 may be in fluid communication with piston passageway 12, thereby allowing pressurized fluid from retainer pressure pipe 26 to flow from retainer pressure passageway 28 to piston passageway 12. In one preferred embodiment, a first biasing member 31 may be provided in inner cavity 30 of top cover 6. First biasing member 31 may rest on a top surface of a first piston 50 and extend to abut against a top surface of inner cavity 30 of top cover 6. First biasing member 31 may provide a biasing force against first piston 50 that biases first piston 50 towards a lower end of the piston passageway 12. In one embodiment, first biasing member 31 may be a spring. In another embodiment, first biasing member 31 may not be used with hot wheel protection valve 2.

An exhaust passageway 32 may provide fluid communication between exhaust opening 16 and piston passageway 12. A first brake cylinder pipe 34 may be in fluid communication with an inner cavity 38 of bottom cover 8 via first brake cylinder passageway 36. Pressurized fluid from brake cylinder 34 may flow from brake cylinder passageway 36 to piston passageway 12 via inner cavity 38 of bottom cover 8. Pressurized fluid from brake cylinder 33 may be exhausted via exhaust opening 16. A second brake cylinder pipe 40 may be in fluid communication with a second brake cylinder passageway 42 via second brake cylinder opening 20. Pressurized fluid is supplied from second brake cylinder pipe 40 to piston passageway 12 via second brake cylinder passageway 42. A brake pipe 44 may be in fluid communication with a brake pipe passageway 46 via brake pipe opening 22. Retainer pressure pipe 26, first brake cylinder pipe 34, second brake cylinder pipe 40, and brake pipe 44 may be welded onto, screwed into, or fastened via flange to hot wheel protection valve 2, among other methods of connection that will be readily apparent to one of skill in the art. A passageway 67 may provide fluid communication from piston passageway 12 via opening 23.

Referring to FIGS. 6-9, one embodiment of hot wheel protection valve 2 includes several components used for exhausting pressurized fluid from the brake cylinder 33 of the railway vehicle. A method of exhausting the pressurized fluid is described in more detail hereinbelow. A first gasket 48 may be provided in a cavity defined in a bottom surface of top cover 6. First gasket 48 may be used to provide a seal between top cover 6 and main body 4, thereby preventing leakage of pressurized fluid from hot wheel protection valve 2.

A first piston 50 may be positioned in an upper portion of piston passageway 12. First piston 50 may be longitudinally slidable within piston passageway 12. First piston 50 may be T-shaped, with an upper portion of first piston 50 contacting a circumferential inner surface of piston passageway 12. A plurality of circumferential grooves may be defined in the outer surface of first piston 50. The grooves may be provided at different positions longitudinally along first piston 50. A plurality of O-rings 52a, 52b, 52c, 52d may be positioned within the grooves defined in first piston 50. O-rings 52a, 52b, 52c, 52d are provided to prevent leakage of pressurized fluid from piston passageway 12 and hot wheel protection valve 2. Although four grooves and O-rings are shown in connection with first piston 50, it is to be understood that more or less grooves and/or O-rings may be provided to create a tighter seal between first piston 50 and piston passageway 12.

A lower portion of first piston 50 may be positioned within a bushing 54. Bushing 54 may be cylindrical in shape to fit within piston passageway 12. Bushing 54 may be slidable within piston passageway 12. Bushing 54 may enclose the lower portion of first piston 50. A plurality of bushing passageways 56a, 56b, 56c, 56d may be defined in bushing 54. Bushing passageways 56a, 56b, 56c, 56d permit pressurized fluid to pass through bushing 54 and thereby out of hot wheel protection valve 2. Although four bushing passageways are shown in connection with bushing 54, it is to be understood that more or less bushing passageways may be provided to more efficiently allow pressurized fluid to pass through bushing 54. A seat 58 is provided on an inner surface of piston passageway 12 upon which the bushing 54 may rest.

A second piston 60 may be positioned in a lower portion of piston passageway 12. Second piston 60 may be slidable longitudinally along piston passageway 12. A top surface of second piston 60 may abut a bottom surface of first piston 50. Similar to first piston 50, second piston 60 may include a plurality of circumferential grooves defined longituindally along second piston 60. In one embodiment, an O-ring 62 may be positioned in one of the grooves to create a seal between second piston 60 and piston passageway 12, thereby preventing the leakage of pressurized fluid from hot wheel protection valve 2. Although one O-ring is shown positioned on second piston 60, it is to be understood that more O-rings may be used to provide a stronger seal between second piston 60 and piston passageway 12.

A second gasket 64 may be provided in a cavity defined in a top surface of bottom cover 8. Second gasket 64 may be used to provide a seal between bottom cover 8 and main body 4, thereby preventing leakage of pressurized fluid from hot wheel protection valve 2. In one embodiment, a second biasing member 66 may be provided in inner cavity 38 of bottom cover 8. Inner cavity 38 may be in fluid communication with piston passageway 12 and first brake cylinder passageway 36. Second biasing member 66 may rest on a bottom surface of inner cavity 38, extend into piston passageway 12, and abut against the bottom surface of second piston 60. In one embodiment, second biasing member 66 may be biased towards the upper portion of piston passageway 12, thereby providing a biasing force against the bottom surface of second piston 60. In one embodiment, second biasing member 66 is a spring. However, it is to be contemplated that alternative biasing members may be used that provide a resilient member that may be compressed and expanded to providing a biasing force in the direction of second piston 60. It is also contemplated that hot wheel protection valve 2 is operable without second biasing member 66.

A method of using a hot wheel protection valve 2 to exhaust brake cylinder pressure for a brake system of a railway vehicle is described hereinbelow. As previously discussed, by using hot wheel protection valve 2, any excess pressurized fluid that leaks into the brake cylinder of the railway vehicle may be exhausted from the brake system, thereby avoiding a hot wheel situation for the railway vehicle.

With reference to FIGS. 7-9, during use of this method, first biasing member 31 may apply a predetermined downward force on first piston 50. The predetermined downward force may be provided based on the stiffness and resiliency of first biasing member 31. The downward force exerted by first biasing member 31 on first piston 50 in turn provides a downward force on second piston 60. It is also contemplated that emergency reservoir pressure supplied by emergency reservoir 24 may also provide a downward force on first piston 50. Brake pipe 44 supplies pressurized fluid to piston passageway 12 to apply an upward force on first piston 50. A pressure differential is therefore established between the downward force exerted by first biasing member 31 and the upward force exerted by the pressure supplied by brake pipe 44. First and second brake cylinder pipes 34, 40 supply pressurized fluid to piston passageway 12, thereby exerting an upward force on first piston 50 and second piston 60 corresponding to the brake cylinder 33 pressure. In one embodiment, second biasing member 66 also exerts a predetermined upward force on second piston 60. The amount of force supplied by second biasing member 66 is dependent on the stiffness and resiliency of second biasing member 66. In this embodiment, a pressure differential is developed between first biasing member 31 on one side of first piston 50, and brake pipe 44, first and second brake cylinder pipes 34, 40, and second biasing member 66 on an opposing side of first piston 50. The hot wheel protection valve 2 is positioned in a lap position whenever the opposing forces on the pressure differential are substantially equal. In this situation, bushing passageway 56c, which leads to exhaust passageway 32, is closed off by an outer surface of first piston 50.

During operation of the railway vehicle, pressurized fluid may slowly leak into first brake cylinder pipe 34 thereby bringing the brake cylinder 33 to an excessive pressure level. To avoid a hot wheel condition, this excessive pressure should be vented from the brake cylinder 33. As the pressure increases in the brake cylinder 33, the upward force from the pressurized fluid supplied by first and second brake cylinder pipes 34, 40 is increased and unbalances the pressure differential in hot wheel protection valve 2. Second piston 60 pushes upwardly on first piston 50. As first piston 50 is moved upwardly, bushing passageway 56c is opened and fluid communication is established between piston passageway 12 and exhaust passageway 32. A groove 53 on first piston 50 allows for fluid communication from brake cylinder 33 through second brake cylinder passageway 42, through bushing passageway 56b, through piston passageway 12, through exhaust passageway 32, and to exhaust opening 16. This fluid communication allows pressurized fluid from second brake cylinder pipe 40 to vent through bushing passageway 56c to exhaust to atmosphere through exhaust passageway 32. As pressurized fluid is vented from the brake cylinder 33, the upward pressure exerted on second piston 60 is reduced accordingly. As the upward pressure exerted on second piston 60 is reduced, the pressure differential is brought back to the lap position, wherein the downward pressure exerted by first biasing member 31 is substantially equal to the upward pressures supplied by brake pipe 44, first and second brake cylinder pipes 34, 40, and second biasing member 66. Hot wheel protection valve 2 may be configured to reach the lap position when brake cylinder 33 pressure stops increasing and reduces the pressure on second piston 60. Hot wheel protection valve 2 may "meter" or continually vent to match the leakage into brake cylinder 33 and prevent an increase above a predetermined level in brake cylinder 33.

In one embodiment, the pressure supplied by retainer cavity 27 may be set to a high pressure setting. In this embodiment, the downward force exerted by the pressurized fluid of retainer cavity 27, in addition to bias member 31, is so much greater than the upward forces exerted by brake pipe 44, first and second brake cylinder pipes 34, 40, and second biasing member 66 that the use of hot wheel protection valve 2 is essentially nullified since the pressure exerted upwardly on first piston 50 by brake pipe 44, first and second brake cylinder pipes 34, 40, and second biasing member 66 is not enough to overcome the pressure supplied by retainer cavity 27 in addition to bias member 31. Therefore, an operator has the option to cut-off connection to hot wheel protection valve 2 by setting retainer pressure pipe 26 to a high pressure position.

While various embodiments of hot wheel protection valve 2 were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The disclosure described hereinabove is defined by the appended claims and all changes to the invention that fall within the meaning and the range of equivalency of the claims are to be embraced by their scope.

The invention claimed is:
1. A hot wheel protection valve, comprising:
  a body defining a piston passageway and at least one piston positioned within the piston passageway;
  an emergency reservoir in fluid communication with a first end of the at least one piston,
  a brake pipe in fluid communication with a second end of the at least one piston;
  a brake cylinder in fluid communication with the second end of the at least one piston; and
  an exhaust port defined in the body and positioned between first and second ends of the valve,
  wherein pressurized fluid is vented from the brake cylinder via the exhaust port upon a combination of brake cylinder pressure and brake pipe pressure exceeding a force exerted by an emergency reservoir pressure.

2. The hot wheel protection valve as claimed in claim 1, further comprising a first biasing member positioned on the first end of the at least one piston and biased towards the second end of the at least one piston,
wherein the first biasing member is a spring; and
wherein the brake cylinder pressure pushes the at least one piston towards the first end of the valve until She combination of the brake cylinder pressure and the brake pipe pressure equalizes with the force exerted by the first biasing member and the emergency reservoir pressure.

3. The hot wheel protection valve as claimed in claim 1, further comprising a second biasing member positioned in the second end of the valve,
wherein the second biasing member is biased towards the first end of the valve, and
wherein pressurized fluid is vented from the brake cylinder via the exhaust port upon a combination of the brake pipe pressure, the brake cylinder pressure, and a force exerted by the second biasing member exceeding the force exerted by the emergency reservoir pressure.

4. The hot wheel protection valve as claimed in claim 3, wherein the second biasing member is a spring.

5. The hot wheel protection valve as claimed in claim 1, further comprising a retainer pressure pipe in fluid communication with the first end of the at least one piston and a retainer cavity.

6. The hot wheel protection valve as claimed in claim 5, wherein use of the valve is nullified by supplying pressurized fluid from the retainer pressure pipe to the first end of the at least one piston.

7. The hot wheel protection valve as claimed in claim 1, further comprising at least one bushing positioned in the piston passageway;
wherein the at least one bushing includes at least one bushing passageway in fluid communication with the exhaust port and the piston passageway, and
wherein pressurized fluid is vented from the brake cylinder through the at least one bushing passageway of the at least one bushing and the exhaust port.

8. A railway vehicle with a hot wheel protection valve, comprising:
a body defining a piston passageway and at least one piston positioned within the piston passageway;
an emergency reservoir in fluid communication with a first end of the at least one piston,
a brake pipe in fluid communication with a second end of the at least one piston;
a brake cylinder in fluid communication with the second end of the at least one piston; and
an exhaust port defined in the body and positioned between first and second ends of the valve,
wherein pressurized fluid is vented from the brake cylinder via the exhaust port upon a combination of brake cylinder pressure and brake pipe pressure exceeding a force exerted by an emergency reservoir pressure.

9. The railway vehicle as claimed in claim 8, further comprising a first biasing member positioned on the first end of the at least one piston and biased towards the second end of the at least one piston,
wherein the first biasing member is a spring; and
wherein the brake cylinder pressure pushes the at least one piston towards the first end of the valve until the combination of the brake cylinder pressure and the brake pipe pressure equalizes with the force exerted by the first biasing member and the emergency reservoir pressure.

10. The railway vehicle as claimed in claim 8, further comprising a second biasing member positioned in the second end of the valve,
wherein the second biasing member is biased towards the first end of the valve, and
wherein pressurized fluid is vented from the brake cylinder via the exhaust port upon a combination of the brake pipe pressure, the brake cylinder pressure and a force exerted by the second biasing member exceeding the force exerted by the emergency reservoir pressure.

11. The railway vehicle as claimed in claim 10, wherein the second biasing member is a spring.

12. The railway vehicle as claimed in claim 8, further comprising a retainer pressure pipe in fluid communication with the first end of the at least one piston and a retainer cavity.

13. The railway vehicle as claimed in claim 12, wherein use of the valve is nullified by supplying pressurized fluid from the retainer pressure pipe to the first end of the at least one piston.

14. The railway vehicle as claimed in claim 8, further comprising at least one bushing positioned in the piston passageway,
wherein the at least one bushing includes at least one bushing passageway in fluid communication with the exhaust port and the piston passageway, and
wherein pressurized fluid is vented from the brake cylinder through the at least one bushing passageway of the at least one bushing and the exhaust port.

15. A method of venting excess pressurized air from a brake cylinder of a railway vehicle, comprising the steps of:
a) providing a hot wheel protection valve, comprising:
at least one piston positioned in between a first end and a second end of the valve;
an emergency reservoir in fluid communication with a first end of the at least one piston;
a brake cylinder in fluid communication with a second end of the at least one piston; and
an exhaust port positioned in between the first and second ends of the valve, and
b) venting pressurized fluid from the brake cylinder via the exhaust port upon a brake cylinder pressure exceeding an emergency reservoir pressure.

16. The method of venting excess pressurized air from a brake cylinder as claimed in claim 15, further comprising the steps of providing a first biasing member biased against the first end of the at least one piston and a second biasing member biased against a second end of the at least one piston, and venting pressurized fluid from the brake cylinder via the exhaust port upon a combination of the brake cylinder pressure and a force exerted by the second biasing member exceeding a force exerted by the first biasing member and the emergency reservoir pressure.

17. The method of venting excess pressurized air from a brake cylinder as claimed in claim 15, further comprising the steps of providing pressurized fluid from a retainer pressure pipe to the first end of the at least one piston,
wherein, use of the valve is nullified due to the combination of the force exerted by the first biasing member and the retainer pressure far exceeding the brake cylinder pressure.

* * * * *

UNITED STATES PATENT AND TRADEMARK OFFICE
CERTIFICATE OF CORRECTION

PATENT NO. : 10,029,666 B2
APPLICATION NO. : 14/662438
DATED : July 24, 2018
INVENTOR(S) : Edward W. Gaughan et al.

It is certified that error appears in the above-identified patent and that said Letters Patent is hereby corrected as shown below:

In the Claims

Column 9, Line 9, Claim 2, delete "She" and insert -- the --

Signed and Sealed this
Sixth Day of November, 2018

Andrei Iancu
*Director of the United States Patent and Trademark Office*

UNITED STATES PATENT AND TRADEMARK OFFICE
CERTIFICATE OF CORRECTION

| | |
|---|---|
| PATENT NO. | : 10,029,666 B2 |
| APPLICATION NO. | : 14/662438 |
| DATED | : July 24, 2018 |
| INVENTOR(S) | : Edward W. Gaughan |

Page 1 of 1

It is certified that error appears in the above-identified patent and that said Letters Patent is hereby corrected as shown below:

In the Claims

In Claim 17 at Column 10, Line 58, the portion reading "from claim 15" should read --from claim 16--.

In Claim 17 at Column 10, Lines 61-64, the portion reading "the first biasing member and the retain pressure far exceeding" should read --the first biasing member and the pressurized fluid from the retain pressure pipe far exceeding--.

Signed and Sealed this
Twenty-ninth Day of November, 2022

Katherine Kelly Vidal
*Director of the United States Patent and Trademark Office*